United States Patent
Weber et al.

[11] 3,830,081
[45] Aug. 20, 1974

[54] CLUTCH

[75] Inventors: Bernhard Weber, Hirzweiler; Alfred Pfaff, Schiffweiler, both of Germany

[73] Assignee: Harold Barth, Saar, Germany

[22] Filed: Oct. 25, 1972

[21] Appl. No.: 300,612

[30] Foreign Application Priority Data
Oct. 27, 1971    Germany............................ 2153411

[52] U.S. Cl. ...................... 64/14, 64/11, 64/27 NM
[51] Int. Cl. .............................................. F16d 3/64
[58] Field of Search ............... 64/14, 11, 27 NM, 16

[56] References Cited
UNITED STATES PATENTS

| | | | |
|---|---|---|---|
| 2,932,179 | 4/1960 | Grant | 64/14 |
| 3,257,825 | 6/1966 | Croset | 64/14 |
| 3,638,454 | 2/1972 | Croset | 64/14 |

FOREIGN PATENTS OR APPLICATIONS

| | | | |
|---|---|---|---|
| 22,640 | 10/1900 | Switzerland | 64/14 |
| 575,163 | 11/1944 | Great Britain | 64/14 |
| 1,104,652 | 11/1955 | France | 64/14 |

Primary Examiner—Samuel Scott
Assistant Examiner—Randall Heald
Attorney, Agent, or Firm—Michael S. Striker

[57] ABSTRACT

A pair of clutch plates are provided on their respective juxtaposed surfaces with two annuli of circumferentially spaced claws, with the claws of each annulus interengaging between adjacent claws of the other annulus. Intermediate second claws are also provided, each being located between two circumferentially adjacent ones of the first-mentioned claws and defining with them circumferentially offset compartments. Pressure bodies are accommodated in these compartments and are of a material having a degree of elasticity which is substantially greater than that of the material of the second claws which latter have limited freedom of movement relative to the first claws in circumferential direction.

32 Claims, 4 Drawing Figures

CLUTCH

BACKGROUND OF THE INVENTION

The present invention relates to a clutch in general, and more particularly to a claw-type clutch. Still more specifically, the invention relates to an elastic claw clutch having two clutch plates and engaging claws, with pressure bodies being provided intermediate the claws.

Clutches of this general type are known in the art. They are provided for purposes of compensation and damping of movements, as well as for compensating axially parallel or angular shaft displacement, wherever drives of many different kinds are employed. One of their particularly advantageous characteristics is their simple and strong construction. However, there have been applications where this type of clutch has not been found advantageous. The reason for this is that there is only a very limited angle within which the two clutch plates can become circumferentially displaced relative to one another; because of this, these clutches cannot compensate for or dampen strong sudden torques acting upon the components coupled by the clutch and which occur as rotary oscillations with large amplitude. This type of sudden load occurs mainly in the case of piston engines, especially combustion engines and, in order to be able to effectively dampen under those circumstances, there must be a relatively low deformation distance in the elastic deformation range of the damping components. In other words, the damping components must be capable of yielding for a relatively long distance within the elastic deformation range. This, however, cannot be achieved with known claw-type clutches because the maximum angle of circumferential displacement between the clutch plates is too small. This angle constitutes the circumferential angle within which the two clutch plates can turn with reference to one another, dictated by the interengaging claws of the plates and under elastic deformation of the pressure bodies which are located between the claws and serve for damping purposes. Thus, the maximum angle of circumferential displacement corresponds to the maximum deformation distance of the elastic pressure bodies.

Attempts have been made to couple two or more such clutches one behind the other, in order to obtain a double or multiple maximum angle of circumferential relative displacement. However, this solution is, of course, very disadvantageous because the axial length of a clutch using several clutch units in this manner is very considerable, and in most instances such a composite clutch cannot be accommodated in the space available, for instance in vehicles between the drive motor and the output side thereof, because in vehicles the space is usually at a premium. Quite aside from this there is the fact that it is clearly very expensive to produce such a multiple or composite clutch.

Yet, it would be desirable to be able to employ a claw-type clutch of the type here under discussion, for the applications mentioned above, because of the simplicity and rugged construction of such clutches, and the attendant relatively inexpensive construction of the individual clutch unit as well as the low susceptibility to malfunction or breakdown.

SUMMARY OF THE INVENTION

Accordingly, it is a general object of the present invention to provide an improved claw-type clutch which avoids the disadvantages of the prior art.

More particularly, it is an object of the present invention to provide a clutch of the type in question which is capable of damping or compensating for rotary oscillations with high amplitudes.

In addition, it is an object of the invention to provide such a clutch which is of compact construction and has a small space requirement.

Still another object of the invention is to provide such a clutch which is inexpensive to construct and is rugged.

In keeping with these objects, and others which will become apparent hereafter, one feature of the invention resides in a clutch of the type in question, and in particular in a combination in such a clutch of a pair of clutch plates having respective juxtaposed surfaces, and a first and a second annulus of circumferentially spaced first claws provided on the respective surfaces. The claws of one annulus interengage between the claws of the other annulus.

There is further provided a plurality of intermediate second claws each of which is located between two circumferentially adjacent ones of the first claws, with the second claws being located in the plane of the first claws and having limited freedom of movement relative thereto in circumferential direction. The second claws define with the first claws a plurality of circumferentially offset compartments and are of a material having a first degree of elasticity, and a plurality of pressure bodies is accommodated in the respective compartments and these pressure bodies are of a material having a second degree of elasticity which is substantially greater than the first degree of the material of the second claws.

In such a construction there will be located at least two of the pressure bodies between two circumferentially adjacent ones of the first claws, with a second claw interposed between these two pressure bodies. However, there can also be more than two of the pressure bodies and more than one of the second claws so located.

If only two pressure bodies and a single second claw are located between two circumferentially adjacent ones of the first claws, a clutch so constructed provides for transmission of circumferentially acting forces from each claw of the driven clutch to a first pressure body, from the first pressure body to an intermediate claw, from the intermediate claw to a second pressure body and from the latter to a claw (first claw) of the driven clutch plate. Because each of the intermediate claws has limited freedom of displacement in circumferential direction, the elastic deformation of the pressure bodies contacting it is the factor which limits such displacement, and in operation of a clutch when subjected to a circumferentially acting force, deformation in sequence of the pressure bodies associated with the intermediate claw has to take place. This means that by comparison to a conventional claw-type clutch, in which all other factors are equal, the clutch according to the present invention is capable of affording an angle of relative circumferential displacement of the clutch plates which is double that of the conventional clutch.

According to the present invention the intermediate claws of the clutch are of a material whose elasticity is substantially lower than the elasticity of the material of which the pressure bodies are composed, or conversely the pressure bodies are of a material whose elasticity is substantially greater than that of the material of which the intermediate second claws are made. Thus, the second claws in effect constitute pressure transmitting elements which in operation of the coupling are subject only to a very slight and negligibly small elastic deformation, that is whose elastic deformation in operation of the clutch will be substantially smaller than that of the pressure bodies.

The clutch according to the present invention thus has the advantage that, depending upon how many intermediate claws are located between two circumferentially adjacent first claws, the maximum angle of relative circumferential displacement between the clutch plates can be doubled or multiplied. The maximum angle of circumferential displacement is doubled if a second claw is located together with two of the pressure bodies intermediate two circumferentially adjacent ones of the first claws; the angle is tripled if two second claws and three pressure bodies are located between two circumferentially adjacent first claws, and so on. The second claws are located in the same plane in which the first claws are located, so that the axial length of the clutch is no greater than that of a conventional clutch of the same type. This means that the clutch according to the present invention can be employed in applications where space is at a premium, for instance in motor vehicles. Evidently, a clutch according to the present invention has the further advantage of being substantially less expensive to construct than a composite clutch as mentioned above, that is a clutch in which several of the claw-type clutches of the prior art are arranged axially behind one another to obtain the same damping capability which can be obtained with a single clutch unit according to the present invention.

According to a further concept of the invention, a particularly advantageous embodiment has the intermediate claws connected with one another by a mounting ring which extends coaxially with reference to the axis of the coupling, that is the axes of the first and second annulus of first claws, and which extends around the region of the outer circumference of the clutch, with the second claws having radially inwardly directed free ends. However, another advantageous embodiment proposes to connect the intermediate second claws with a similar ring which in this instance is an inner ring, that is a ring which also extends coaxially with the clutch axis but is located radially inwardly with the second claws extending from it in radially outward direction and having outer free ends.

Still a further embodiment of the invention proposes to make the intermediate claws of one piece with the mounting ring and loosely guide them on the pressure bodies. If the mounting ring is a radially inner mounting ring it is possible to mount this for free turning movement on a component of one of the clutch plates, for instance a stub-shaped projection. However, in actual practice is has been found advantageous if the intermediate claws are simply loosely guided on the pressure bodies, together with their mounting ring. In such an arrangement the mounting ring with the associated intermediate claws is capable of centering itself even if the clutch rotates very rapidly.

Although it is possible to have more than one second claw and more than two pressure bodies located between two circumferentially adjacent ones of the first claws, it has been found in practice that for most applications it is entirely sufficient and, in fact, advantageous, to utilize only a single second claw and two pressure bodies intermediate two circumferentially adjacent first claws. However, if it is indeed necessary to obtain a further increase in the maximum angle of circumferential displacement of the clutch plates relative to one another, for instance two second claws and three pressure bodies may be located between any two circumferentially adjacent first claws.

It is advantageous if the pressure bodies are at least approximately configurated as bodies of rotation, for instance barrel-shaped, and if their longitudinal axes extend approximately parallel to the axis of the coupling. It is further advantageous if the compartments are configurated matingly with respect to the configuration of the pressure bodies. Cylindrical and in particular barrel-shaped pressure bodies permit an almost uniform elastic deformation and therefore an almost uniform transmittal of forces via the entire plurality of elastic pressure bodies of the clutch.

The clutch according to the present invention can be constructed particularly economically if all of the claws are provided in the regions which delimit the compartments for the elastic pressure bodies, of at least substantially the same cross-sectional configuration and dimensions in a plane extending radially of the clutch axis. This means that all of the elastic pressure bodies can have identical dimensions and configurations and can, of course, be inexpensively produced.

If the clutch according to the present invention is to rotate rapidly, the centrifugal force acting upon the elastic pressure bodies tends to force them outwardly between the claws. This force is quite significant and it is therefore necessary to prevent such movement of the pressure bodies. In accordance with the present invention this is achieved, in a manner that is reliable even at high circumferential speeds of the clutch, in that the claws surround with their side faces which extend approximately radial to the clutch axis the predominant part of the circumferential surfaces of the pressure bodies. Thus, the pressure bodies are reliably retained, even if the clutch rotates at relatively high circumferential speeds, and this advantage is further increased if the outer edges of circumferentially adjacent claws, which edges extend approximately parallel to the axes of the coupling and of the clutch, have in the unstressed condition of the clutch a circumferential distance from one another which is less than the maximum dimension of a pressure body in circumferential direction of the clutch. The same purpose of preventing the pressure bodies from outward movement under the influence of centrifugal force can also be achieved if they are mounted on a ring which connects them with one another, located in the region of the outer circumference of the clutch in coaxial arrangement relative to the clutch axis, and which in effect surrounds the pressure bodies at their radially outer ends to thereby prevent their radially outward movement under the influence of centrifugal force. In fact, such a ring can be provided in addition to the above-mentioned measure.

According to another concept of the invention it is advantageous if the spacing of the outer edges of two circumferentially adjacent claws, which edges extend approximately parallel with the clutch axis, measured in circumferential direction of the clutch, is greater in the un-stressed condition of the clutch than the maximum deformation distance of which pressure bodies can be capable in operation, measured in parallelism with the circumferential direction of the clutch. This arrangement assures that at maximum amplitudes of the rotary oscillations, that is at a maximum angle of circumferential displacement of the clutch plates relative to one another, a direct contact between circumferentially adjacent claws can never take place.

A radial displacement in outward direction of the pressure bodies cannot be entirely prevented, especially at high circumferential speeds of the clutch. Furthermore, the clutch plates themselves together with their claws turn relative to one another in circumferential directions due to the different torques acting upon them. Damage or excessively fast wear of those portions of the pressure bodies which extend radially outwardly from the clutch axis is avoided under these circumstances and in accordance with the present invention, in that the outer edges of the claws which extend in approximate parallelism with the clutch axes are rounded in direction inwardly of the respective compartments. A similarly advantageous effect with respect to those sections of the pressure bodies which extend radially inwardly towards the clutch axis is achieved in that the free ends of the first claws, and if the second claws have inwardly directed free ends these also, have rounded edges.

The clutch plates themselves are advantageously of metal, for instance of cast iron, light metal such as aluminum or the like, or of a relatively hard synthetic plastic material such as e.g. polyamide. The intermediate claws themsleves, and advantageously the mounting ring therefor, can also be of metal, for instance cast iron or light metal or the like.

It is of course desirable that the clutch have a relatively light weight. In accordance with the invention this can be achieved in that the intermediate second claws and advantageously the mounting ring thereof may be made of a relatively hard synthetic plastic material, for instance polyamide. The elastic pressure bodies, on the other hand, are of an elastomeric material such as natural or synthetic rubber. The use of a relatively hard synthetic plastic such as polyamide or the like, in conjunction with the use of an elastomer such as natural or synthetic rubber of course provides additional damping efficiency.

According to a further advantageous embodiment of the invention all elastic pressure bodies are connected by a ring which is located radially inwardly of them, that is inwardly of the pressure bodies in direction towards the clutch axis. This is a construction that is particularly advantageous if the intermediate claws are connected with one another by a mounting ring which extends coaxially with the clutch axis around the outer circumference of the clutch and if the intermediate second claws have radially inwardly extending free ends. The connecting ring for the pressure bodies permits in such a construction a rapid installation or removal of the entire plurality of pressure bodies, and because it can be supported against the radially inwardly directed second claws this ring also prevents an undesired radial displacement of the elastic pressure bodies in outward direction, which would tend to disadvantageously influence the damping effect.

Still another concept of the invention provides for having circumferentially adjacent ones of the pressure bodies connected by connecting portions which are located radially inwardly of them in direction towards the clutch axis. This is used to advantage is the intermediate claws are connected with one another by a mounting ring which extends coaxially to the clutch axis and is located inwardly of the second claws in direction towards the clutch axis. In such a case the second claws will have radially outwardly directed free ends. This particular arrangement can also be used if the mounting ring for the second claws extends along the outer circumference of the clutch, and in any case the connecting portions will then contact the inwardly directed ends of the claws and also prevent radially outward displacement of the pressure bodies.

Work on the novel clutch, particularly installation of the pressure bodies themselves, is facilitated if in unstressed condition of the clutch the radially inwardly directed free ends of the claws are arranged with spacing from the opposite surfaces of an inwardly located ring (see above) or the inwardly located connecting portions (see above). This distance assures that the pressure bodies together with their connecting ring or their connecting portions can be readily shifted in parallelism with the clutch axis into their final position of installation. As soon as the clutch is operated the ring or connecting portions connecting the pressure bodies will contact the inwardly directed free ends of the claws and prevent undesired radial displacement of the pressure bodies. If the connecting portions are used for connecting the pressure bodies, than it is advantageous if they are located with spacing from the inner mounting ring connecting the second claws in such an embodiment. This facilitates installation of the pressure bodies.

The heat which develops during the elastic deformation of the pressure bodies is advantageously dissipated by providing the mounting ring (if it is an outer mounting ring) of the second claws with cooling fins. If the ring is an inner mounting ring then it may be provided with circumferentially extending annular cooling fins. Another embodiment proposes to provide the mounting ring, if the latter is an outer mounting ring, with cooling fins which extends approximately tangential and in parallelism with the clutch axis.

If the novel clutch is used for compensating axially parallel or angular shaft displacements, as is known in conjunction with the prior-art clutches of this type, a contacting of the side faces of the intermediate claws or the inner or outer mounting ring thereof with the adjacent surfaces of the two clutch plates can be avoided in accordance with the present invention, and a low-noise operation of the clutch can be assured, by providing the side faces of the intermediate claws and/or the mounting ring, which side faces extend approximately radial to the clutch axis, with distance projections of synthetic plastic material, for instance polyamide, which extend in direction towards the clutch plates. Similar advantages can be obtained if the second claws are of synthetic plastic material, for instance polyamide, by providing the aforementioned side faces with projections which are formed of one piece with them and extend in direction towards the clutch plates.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
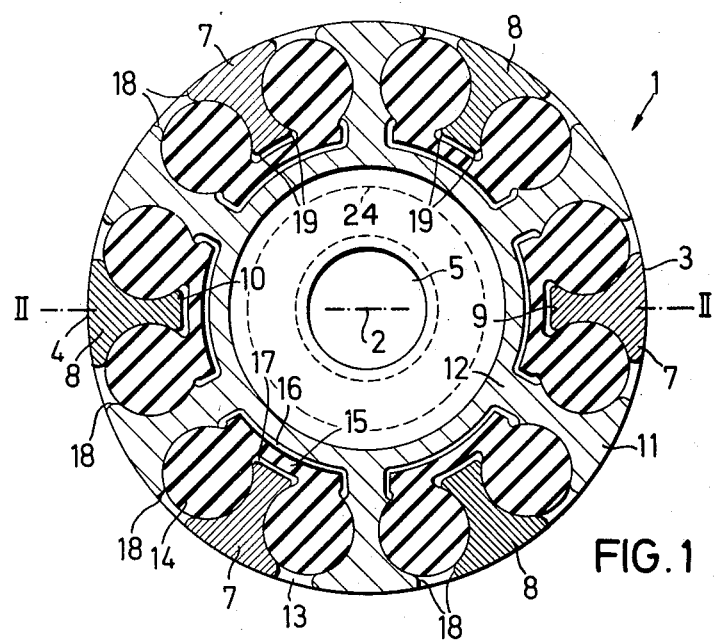
FIG. 1 is a section of the clutch according to the present invention.
Figure 2:
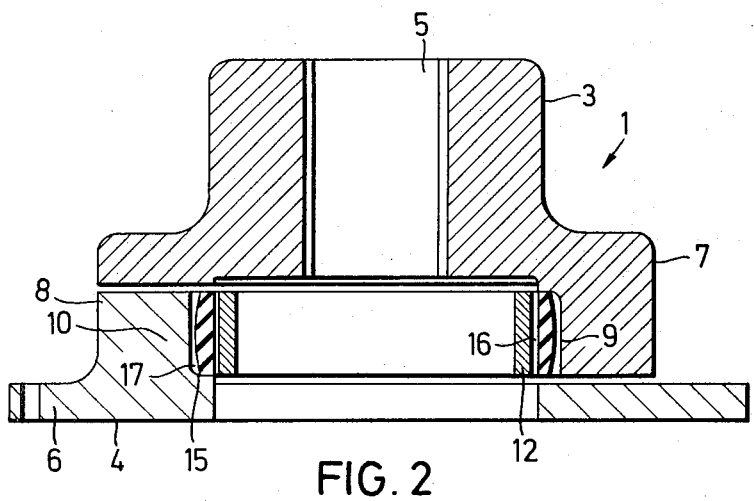
FIG. 2 is a section taken on line II—II of FIG. 1.

Discussing the drawing in detail, and firstly the embodiment illustrated in FIGS. 1 and 2, it will be seen that the clutch per se is designated with reference numeral 1. The section illustrated in FIG. 1 is taken transversely to the clutch axis 2 and it will be seen, especially from a comparison of FIGS. 1 and 2, that the clutch has two clutch plates 3 and 4 which may either be driven or driving; in other words the clutch plate 3 may either be a driven plate or a driving plate, and the same is true for plate 4. A comparison with FIG. 3 will show that the clutch plate 3 has a central internal bore in which a non-illustrated shaft can be accommodated, either a drive shaft or an output shaft. Of course, the shaft will be connected with the clutch plate 3 against relative rotation in a manner well known per se.

The clutch plate 4 is configured as a flanged plate with an annular connecting flange 6 which can be connected with another flange, either of a driving instrumentality or of a driven component. The plate 3 has a plurality of projections or claws 7 arranged in form of an annulus, and the plate 4 is provided with other claws 8 which are also arranged to form an annulus. In this embodiment the claws 7 and 8 have free ends 9 and 10, respectively, which extend radially inwardly towards the clutch axis 2, and between each two circumferentially adjacent claws 7 and 8 there is located an intermediate claw 11, which latter are connected with one another by a mounting ring 12 located radially inwardly of the claws 11.

Pressure-transmitting bodies of elastically yieldable material are identified by reference numeral 14 and are located in the circumferentially offset compartments which are defined, respectively, between cooperating claws 7, 8 and 11. The bodies 14 are substantially configured as bodies of rotation, such as being of cylindrical or barrel-shaped contour. Their longitudinal axes are at least substantially parallel to the clutch axis 2.

In the illustrated embodiment two adjacent bodies 14 are always connected by strip portions 15 with one another in those regions which extend radially inwardly towards the clutch axis 2. Between the strip portions 15 and the ring 12, that is between the strip portion 15 and the inwardly extending ends 9 and 10 of the claws 7 and 8, a clearance 16 or 17 is provided which makes for ready insertion of the bodies 14 with these strip portions 15, when the clutch is to be assembled. This will be evident from FIG. 1 where it will be seen that with such an arrangement the bodies 14 and their strip portions 15 can be readily pushed in parallelism with the clutch axis 2 into their respective compartments 14. The latter are, incidentally, configured so as to conform to the configuration of the bodies 14, as is evident from FIG. 1.

The portions of the claws 7, 8 and 11 which bound the compartments 13 have approximately the same cross-sectional configuration and dimensions, as seen with respect to a sectional plane extending radially of the clutch axis 2. The side faces of the claws 7, 8 and 11 which extend substantially radially with respect to the clutch axis 2, surround at least the major portion of the circumferential surfaces of the bodies 14.

When the clutch is in un-stressed state, that is when no torque is transmitted, the edges 18 of adjacent claws 7 and 11, or 8 and 11, which edges extend approximately parallel to the clutch axis 2, are spaced from one another in the circumferential direction of the clutch by a distance which is smaller than the maximum dimension of the bodies 14 as measured in the direction parallel to the circumferential direction of the clutch 1. In this instance the maximum dimension is, of course, equal to the diameters of the respective bodies 14. However, as soon as the clutch 1 is in operation, the bodies 14 are compressed by an elastic deformation distance in parallel with the circumferential direction of the clutch, and in order for the adjacent edges 13 to be prevented from contact during such operation, the maximum deformation distance of the bodies 14 parallel to the circumferential direction of the clutch 1 is less than the distance of the edges 13 in the un-stressed condition of the clutch. The maximum deformation distance in direction parallel to the circumferential direction of the clutch 1 of two cooperating ones of the bodies 14 which are located between adjacent claws 7 and 8, that is the distance to which the bodies jointly can be deformed (can yield), corresponds to the maximum rotational angle of displacement of the clutch plates with reference to one another.

FIG. 1 shows that in the operation of the clutch the circumferential force is transmitted for example from a claw 7 of plate 3 to a body 14, from there to an intermediate claw 11, from the same to a further body 14 and from the latter to a claw 8 of the plate 4. Of course, the reverse would be true if the plate 4 were transmitting the torque, and of course the sequence of transmittal can begin with a claw other than the claw 7. In any case, however, the torque is always transmitted from the driving side of the driven side of the clutch 1 via the intermediary of the claws and of the bodies 14. Due to the deformation of the bodies 14 which are thus interposed in the torque-transmitting chain of parts, and of which each is compressed by a certain predetermined deformation distance between the claws cooperating with it, an angle of relative rotational displacement between the plates 3 and 4 can be achieved with the clutch 1 illustrated in FIGS. 1 and 2, which is double that which can be achieved with the known clutches of this type.

The edges 18 are rounded inwardly towards the compartments 13, as shown in FIG. 1, to prevent damage to the bodies 14, and similarly between the radially inwardly free ends 9 and 10 of the claws 7 and 8 the edges are rounded for the same purpose. This is particularly advantageous if the bodies 14 shift radially outwardly by a certain amount in response to high circumferential speeds of clutch 1, because this permits the claws 7, 11 and 8 to move relative to one another, which would cause damage to the bodies 14 if the edges 18 and 19 were not so rounded.

The mounting ring 12 connecting the claws 11 with one another is located in the same plane in which the claws 7 and 8 of the clutch plates 3 and 4 are located, so that the claws 11 together with their mounting ring 12 do not require any increase in the overall axial length of the clutch (see FIG. 2), and thus the improved performance of the novel clutch is achieved without any increase in its size and therefore of the space required to accommodate it.

Figure 3:
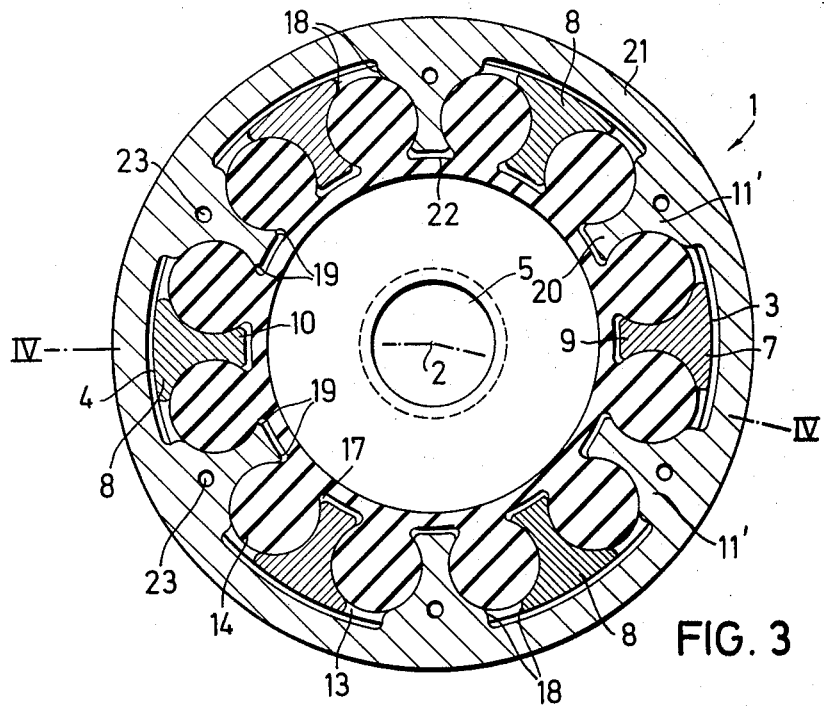
FIG. 3 is a view similar to FIG. 1 but of another embodiment.
Figure 4:
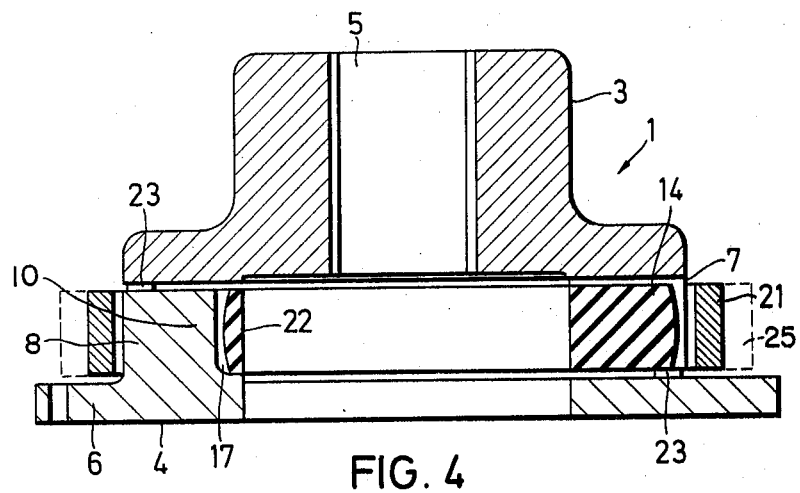
FIG. 4 is a section taken on line IV—IV of FIG. 3.

Coming now to the embodiment in FIGS. 3 and 4 it will be seen that here the majority of the components is the same as illustrated in FIGS. 1 and 2, for which reason like components have been given like reference numerals as in FIGS. 1 and 2.

In FIGS. 3 and 4, however, the claws 11 are replaced with claws 11' which differ from the claws 11 in that they have free ends 20 extending radially inwardly towards the clutch axis 2, whereas they are connected by a mounting ring 21 which extends along the outer circumference of the clutch coaxially with the axis 2. The fact that the ring 21 is arranged along the outer circumference of the clutch makes it possible to connect the bodies 14 by means of a ring 22 which is located radially inwardly of the bodies 14 in direction towards the axis 2. This means that the entire assembly composed of the bodies 14 and the ring 22 can be readily removed in a very simple manner, as an inspection of FIG. 3 will inindicate very clearly.

The mounting ring 21 can be so configured that it constitutes an abutment for the bodies 14 which tend to become displaced radially outwardly, due to the action of centrifugal force during high speed rotation of the clutch 1. The embodiments of FIGS. 1–4 show a relationship of the distance between the edges 18 of any two circumferentially adjacent claws which is so selected with reference to the diameter of the bodies 14 that excessive radial displacement of the bodies 14 in radially outward directions is prevented, even if the clutch rotates at relatively high circumferential speeds. The edges 18 of any two circumferentially adjacent claws will have, in the un-stressed condition of the clutch, a circumferential spacing from one another which is less than the diameter of the bodies 14. As an additional safeguard against undesired radially outward movement of the bodies 14 under the influence of centrifugal force, the portions 15 of FIGS. 1 and 2, and the ring 22 of FIGS. 3 and 4 are provided, because the radially outwardly directed faces of these portions can abut against the radially inwardly directed surfaces of the claws 7, 8 and 11 when the clutch is in operation, thus preventing excessive radially outward movement of the bodies 14 when the clutch is in operation.

The embodiment of FIGS. 3 and 4 shows (see FIG. 3) that the projections 23 which are provided on their inside faces of the claws 11 which extend approximately radially of the axis 2, and that then projections 23 project in the direction towards the adjacent plates 3 and 4. If during the operation of the clutch an axially parallel or angular shaft displacement of the drive shaft and driven shaft is to be compensated between the driving and the driven side of the clutch, the projections 23 maintain the sides of the surfaces of the claws 11 and the ring 21 at a distance from the adjacent clutch plates 3 and 4 and thus assure that the clutch will operate with a minimum of noise. Naturally, these projections can be provided in the embodiment of FIGS. 1 and 2 also, and they can be secured in suitable manner to the claws 11 or may be formed of one piece with them.

In the above illustrated embodiment the clutch plates 3 and 4 are advantageously made of metal, for instance cast iron, light metal (such as aluminum) or the like. The claws 11, and advantageously ring 12 and 21, may similarly be of metal, such as cast iron, light metal or the like. It is particularly advantageous from the manufacturing point of view if the claws 11 are made of one piece with their respective mounting rings 12 and 21 and are made of a hard synthetic plastic such as polyamide or a similar plastic. The bodies 14 are made of an elastomeric material, for instance natural or synthetic rubber.

We have not illustrated cooling fins which may be provided on the outer mounting 21, but it should be understood that such cooling fins can indeed be provided and may either extend continuously in circumferential direction of the clutch or may extend tangentially of the ring 21 and in approximate parallelism with the axis 2.

The elastic deformation of the pressure bodies 14 results in development of heat which is transmitted into the intermediate claws 11 and into the mounting ring 12 or 21. If this heat is to be effectively dissipated, the mounting ring 12 or 21 may be provided with cooling fins 24 or 25, respectively. These fins have been shown in broken lines in FIGS. 1 and 4, respectively, while they have been omitted in FIGS. 2 and 3 for the sake of clarity. The fins 24 extend circumferentially of the mounting ring 12, while the fins 25 extend radially of the mounting ring 21 and parallel to the axis of the clutch 1. Such fins are well known in the art, as are methods of their production and/or assembly with the clutch. It is to be understood that the fins 24 may also be provided on the ring 21 and the fins 25 on the ring 12 if so desired.

Finally it will be seen in FIGS. 1-4 that the claws 11, which are provided on the mounting rings 12 or 21, are loosely guided on the bodies 14.

It will be understood that each of the elements described above, or two or more together, may also find a useful application in other types of constructions differing from the types described above.

While the invention has been illustrated and described as embodied in a clutch, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In a clutch, a combination comprising a pair of clutch plates having respective juxtaposed surfaces; a first and a second annulus of circumferentially spaced first claws provided on the respective surfaces, the claws of one annulus inter-engaging between the claws of the other annulus; a plurality of intermediate second claws each located between two circumferentially adjacent ones of said first claws, being located in the plane of the latter and having limited freedom of movement relative thereto in circumferential direction, said second claws defining with said first claws a plurality of circumferentially offset compartments and being of a material having a first degree of elasticity; a mounting ring extending coaxially with said clutch plates radially adjacent to said second claws and connecting said second claws with one another; and a plurality of elastic pressure bodies accommodated in the respective compartments and being of a material having a second degree of elasticity which is substantially greater than said first degree.

2. A combination as defined in claim 1, wherein further said mounting ring extends along the outer periphery of said plates; and wherein said second claws have radially inwardly directed free ends.

3. A combination as defined in claim 1, wherein said mounting ring extends inwardly of the outer periphery of said plates and wherein said second claws have radially outwardly directed free ends.

4. A combination as defined in claim 1, wherein further said mounting ring is of one piece with said second claws; and wherein said second claws are loosely guided by contact with said pressure bodies.

5. A combination as defined in claim 1, wherein each of said second claws is located between two circumferentially adjacent ones of said first claws.

6. A combination as defined in claim 1, wherein two of said second claws and three of said pressure bodies are located between every two circumferentially adjacent ones of said first claws.

7. A combination as defined in claim 1, wherein said pressure bodies are configurated as bodies of rotation and have longitudinal axes extending substantially parallel with the axes of said annuli, and wherein said compartments have mating shapes relative to the configuration of said pressure bodies.

8. A combination as defined in claim 7, wherein said pressure bodies are barrel-shaped.

9. A combination as defined in claim 7, wherein all of said first and second claws have in those regions which bound the respective compartments, substantially identical cross-sections and dimensions in a plane extending radially of the axes of said annuli.

10. A combination as defined in claim 9, said claws having side faces extending substantially radially of said axes and embracing at least the major portions of the circumferential surfaces of said pressure bodies.

11. A combination as defined in claim 1, said first and second claws having outer edges extending substantially parallel to the axes of said annuli; and wherein said outer edges of respective circumferentially adjacent claws have in unstressed condition of said clutch a circumferential distance from one another which is smaller than the largest dimension of said pressure bodies in circumferential direction of said plates.

12. A combination as defined in claim 11, wherein the circumferential distance between said edges in unstressed condition of said clutch is greater than the maximum deformation distance of which said pressure bodies are capable in operation of said clutch and in said circumferential direction.

13. A combination as defined in claim 11, wherein said edges are rounded in direction inwardly towards the respective compartments.

14. A combination as defined in claim 1, at least said first claws having radially inwardly directed free ends which are provided with rounded edges.

15. A combination as defined in claim 14, wherein said second claws also have radially inwardly directed free ends which are provided with rounded edges.

16. A combination as defined in claim 1, wherein said plates are of metallic material.

17. A combination as defined in claim 16, wherein said metallic material is selected from the group composed of light metal and cast iron.

18. A combination as defined in claim 1, wherein said plates are of relatively hard synthetic plastic material.

19. A combination as defined in claim 18, wherein said synthetic plastic material is polyamide.

20. A combination as defined in claim 1, wherein said second claws are of metallic material.

21. A combination as defined in claim 1, wherein said second claws are of a relatively hard synthetic plastic material, and said pressure bodies are of elastomeric material.

22. A combination as defined in claim 21, wherein said synthetic plastic material is polyamide, and said elastomeric material is rubber.

23. A combination as defined in claim 1, further comprising a connecting ring connecting all of said pressure bodies and located radially inwardly of the same in direction towards the axis of said annuli.

24. A combination as defined in claim 1, and further comprising a plurality of strip-portions, each connecting at least two circumferentially adjacent ones of said pressure bodies in the region of their radially inwardly located ends.

25. A combination as defined in claim 23, said second claws having radially inwardly directed free ends which in un-stressed condition of said clutch are spaced from said connecting ring.

26. A combination as defined in claim 1, and further comprising a plurality of strip portions, each connecting at least two circumferentially adjacent ones of said pressure bodies in the region of their radially inwardly located ends and being spaced from said mounting ring.

27. A combination as defined in claim 1, further comprising cooling fins provided on said mounting ring.

28. A combination as defined in claim 27, wherein said cooling fins are continuous circumferentially extending cooling fins.

29. A combination as defined in claim 27, wherein said cooling fins extend substantially tangentially of said mounting ring and at least substantially parallel with the axes of said annuli.

30. A combination as defined in claim 1, further comprising distancing projections provided on at least one of said mounting rings and intermediate second claws, projecting towards the respective clutch plates for preventing contact with the same in operated condition of the clutch.

31. A combination as defined in claim 30, wherein said distancing projections are of synthetic plastic material.

32. A combination as defined in claim 30, wherein said mounting ring and/or said intermediate second claws are of synthetic plastic material, and wherein said distancing projections are of one piece with the mounting ring and/or said intermediate second claws.

\* \* \* \* \*